United States Patent
Lee

(10) Patent No.: US 8,407,742 B2
(45) Date of Patent: Mar. 26, 2013

(54) SYSTEM AND METHOD FOR RESERVING PREFERENCE EVENT OF BROADCASTING PROGRAM

(75) Inventor: Ji-Young Lee, Seoul (KR)

(73) Assignee: Alticast Co. Ltd. (KR)

( * ) Notice: Subject to any disclaimer, the term of this patent is extended or adjusted under 35 U.S.C. 154(b) by 658 days.

(21) Appl. No.: 11/874,256

(22) Filed: Oct. 18, 2007

(65) Prior Publication Data

US 2008/0098437 A1    Apr. 24, 2008

(30) Foreign Application Priority Data

Oct. 18, 2006  (KR) .................. 10-2006-0101419

(51) Int. Cl.
  *G06F 3/00* (2006.01)
  *G06F 13/00* (2006.01)
  *H04N 5/445* (2011.01)

(52) U.S. Cl. ............. 725/58; 725/46; 725/43; 725/57; 725/9; 725/142; 725/146

(58) Field of Classification Search ................... None
  See application file for complete search history.

(56) References Cited

U.S. PATENT DOCUMENTS

| 6,049,333 | A  | * | 4/2000 | LaJoie et al. | 715/718 |
| 7,340,762 | B2 | * | 3/2008 | Kim | 725/58 |
| 7,383,563 | B1 | * | 6/2008 | Rashkovskiy | 725/58 |
| 2004/0003405 | A1 | * | 1/2004 | Boston et al. | 725/58 |
| 2005/0076368 | A1 | * | 4/2005 | Lee | 725/58 |
| 2005/0198670 | A1 | * | 9/2005 | Nishimoto | 725/58 |
| 2006/0041911 | A1 | * | 2/2006 | Matsuyama | 725/58 |

FOREIGN PATENT DOCUMENTS

| KR | 1020010027583 | 4/2001 |
| KR | 1020010069122 | 7/2001 |
| KR | 1020060023361 | 3/2006 |
| KR | 1020060030217 | 4/2006 |

* cited by examiner

*Primary Examiner* — Dominic D Saltarelli
*Assistant Examiner* — Jason J Chung
(74) *Attorney, Agent, or Firm* — Cantor Colburn LLP

(57) ABSTRACT

There is provided a preference event reservation system of a broadcasting program including: a head end inserting event information into a broadcasting program sued broadcasting the broadcasting program containing the event information and an event information list; and a client terminal. The client terminal includes a controller displaying the event information list transferred from the head end, controlling a reservation for a preference event out of the event information list, and controlling execution of the reservation when event information that corresponds to the preference event is transferred from the head end; and a memory storing the reservation for the preference event.

11 Claims, 5 Drawing Sheets

SYSTEM AND METHOD FOR RESERVING PREFERENCE EVENT OF BROADCASTING PROGRAM

CROSS-REFERENCE TO RELATED PATENT APPLICATION

This application claims priority to Korean Patent Application No. 2006-0101419, filed Oct. 18, 2006, the contents of which are herein incorporated by reference in their entirety.

BACKGROUND OF THE INVENTION

1. Technical Field

The present invention relates to a preference event monitoring system of a broadcasting program and a method of monitoring a preference event of a broadcasting program, and more particularly, to a preference event reservation system of a broadcasting program, which allows for real time provision of information on a preference event of a specific program, and a method of reserving a preference event of a broadcasting program.

2. Discussion of the Related Art

To identify information on programs for other channels than a current channel, a method of simultaneously displaying a primary screen and a secondary screen on a TV or a method of employing EPG (Electronic Program Guide) has been used.

However, the former method is disadvantageous in that part of the primary screen needs to be allocated to view the sub screen and the secondary screen can not give any voice information, thus leading to a difficulty in recognizing the program) content.

Moreover, the secondary screen should be always checked by a viewer to identify whether at viewer's preference event shows up, and this may distract viewer's attention to the primary screen.

The latter method may let a viewer know the start of a program of another channel by making a reservation, but fails to show the content or point of time of a preference event in the program.

SUMMARY OF THE INVENTION

The present invention has been designed to overcome the above problems, and an aspect of the present invention provides a preference event reservation system which is capable of enabling a viewer to identify whether a viewer's preference event of a program is on the air while watching other channel's program by transmitting event information on the program along with a program.

In an exemplary embodiment, a preference event reservation system of a broadcasting program comprises: a head end inserting event information into a broadcasting program and broadcasting the broadcasting program containing the event information and an event information list; and a client terminal the client terminal having, a controller displaying the event information list transferred from the head end, controlling a reservation for a preference event out of the event information list, and controlling execution of the reservation when event information that corresponds to the preference event is transferred from the head end; and a memory storing the reservation for the preference event.

In another exemplary embodiment, a preference event reservation system of a broadcasting program comprises: a head end inserting event information into a broadcasting program and broadcasting the broadcasting program containing the event information and an event information list; and a client terminal, the client terminal having, a controller controlling setup of a preference program, monitoring the broadcasting program, displaying the event information list for the preference program when the preference program is broadcast, controlling a reservation of a preference event out of the event information list, and controlling execution of the reservation when event information that corresponds to the preference event is transferred from the head end; and a memory storing the reservation for the preference event.

In still another exemplary embodiment, a method of reserving a preference event of a broadcasting program comprises: transferring an event information list from a head end to a client terminal; displaying the event information list to make a reservation for a preference event out of the event information list; broadcasting a broadcasting program containing event information from the head end to the client terminal; and executing the reservation when event information that corresponds to the preference event is transferred.

In yet still another exemplary embodiment, a method of reserving a preference event of a broadcasting program comprises: setting up a preference channel or preference program and storing die preference channel or preference program at a memory; transferring event information lists from a head end to a client terminal; determining whether an event information list for the preference channel or preference program is transferred; displaying the event information list for the channel or preference program to make a reservation for a preference event out of the event information list when the event information list for the preference channel or preference program is transferred; broadcasting a broadcasting program containing event information from the head end to the client terminal; and executing the reservation when event information that corresponds to the preference event is transferred.

A better understanding of the above and many other features and advantages of the organic thin film transistor substrates and methods or making them disclosed herein may be obtained from a consideration of the detailed description thereof below particularly if such consideration is made in communication with the several views of the appended drawings, wherein like elements are referred to by like reference numerals throughout.

BRIEF DESCRIPTION OF THE DRAWINGS

The invention is described more fully hereinafter with reference to the accompanying drawings, in which embodiments of the invention are shown. This invention may, however, be embodied in many different forms and should not be construed as limited to the embodiments set for the herein.

DESCRIPTION OF EXEMPLARY EMBODIMENTS

Hereinafter, constructions and operations of the present invention will be described with reference to accompanying drawings.

Figure 1:
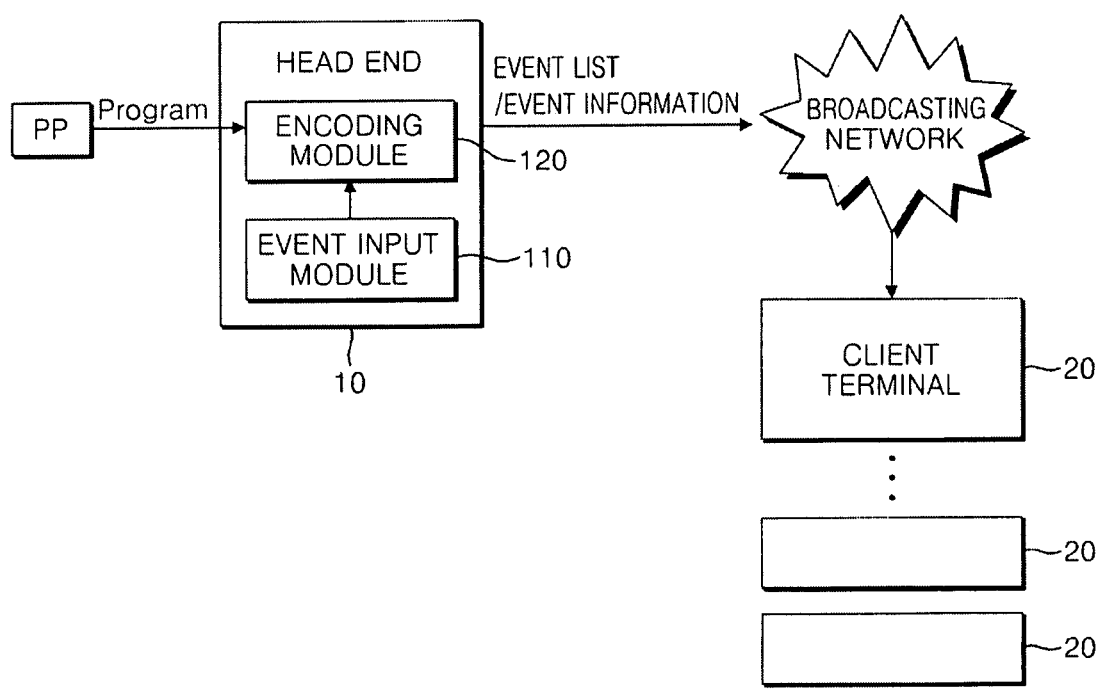
FIG. 1 is a block diagram schematically illustrating a preference event reservation system of a broadcasting program according to an exemplary embodiment of the present invention.
Figure 2:
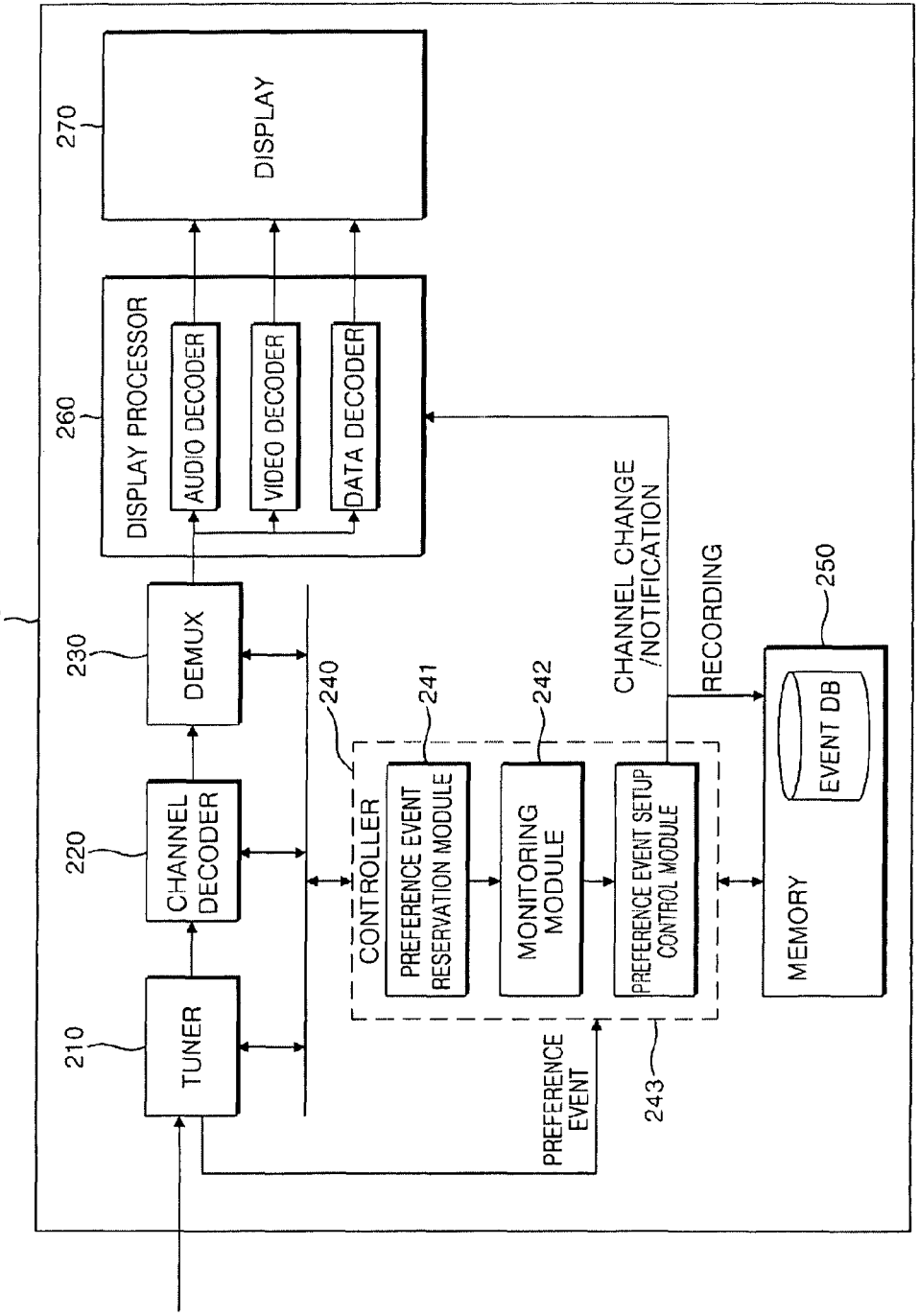
FIG. 2 is a block diagram of a controller in a client terminal according to a first exemplary embodiment of the present invention.

FIG. 1 is a block diagram schematically illustrating a preference event reservation system of a broadcasting program according to an exemplary embodiment of the present invention, and FIG. 2 is a block diagram of a controller in a client terminal according to a first exemplary embodiment of the present invention.

Referring to FIGS. 1 and 2, a preference event reservation system according to a first exemplary embodiment of the present invention, includes a head end 10 and a client terminal 20. The head end 10 inserts event information into a broadcasting program and transfers the broadcasting program and an event information list to the client terminal 20 over a broadcasting network. The client terminal 20 includes a controller 240 and a memory 250. The controller 240 displays the event information list transferred from the head end 10, makes a reservation for a preference event of the event information list and stores the reservation, and provides a user interface according to the reservation when the event information on the reserved preference event is transferred from the head end 10. The memory 250 stores the transferred event information, and reserved preference event and the reservation.

The "event information list" refers to a list of events used for setting up viewer's preference events, which includes an event ID, a program ID, a channel ID, and the content of each event. The "event Information" refers to information to specify the details of each event about the current program, which includes an event ID, a start time of the event, an end time of the event, and details of the event.

The "event" refers to a sub program included in a broadcasting program, such as an entertainment program, a documentary program, and the like. The reservation may be any one of preference event notification, a preference event recording, and an automatic channel change.

More specifically, the head end 10 includes an event input module 110 for receiving detailed event information on a broadcasting program, and an event encoding module 120 for encoding the broadcasting program containing the event information and transferring them as broadcast signals. The event encoding module 120 encodes the broadcasting program and the event information inserted into the broadcasting program by the event input module 110, and transfers them to the client terminal 20.

The head end 10 receives an event information list through the event input module 110, encodes the event information list by the event encoding module 120, and transfers them to the client terminal 20 over a broadcasting network.

Transferring the event information list and event information may be determined depending on digital broadcasting captions, data broadcasting technology, a network property, and the like.

In general digital broadcast, broadcast signals are transmitted from the head end 10 in a bit stream, which is compressed according to a prescribed compression standard, and received at the tuner 210 of the client terminal 20. Desired one out of the received broadcast signals is selected by a key operation unit, such as a remote controller, and extracted by the channel decoder 220 that is controlled by the controller 240.

The extracted broadcast signal is de-multiplexed into video, audio, and information data by the demux 230, transferred to a video decoder, an audio decoder, and an information data decoder, undergoes a signal process, and then displayed on the displaying unit 270.

The controller 240 includes a preference event reservation module 241, a monitoring module 242, and a preference event setup control module 243. The preference event reservation module 242 receives a key input from a viewer, makes a reservation for a viewer's preference event, and stores the reservation at a memory 250. The monitoring module 242 checks whether the reserved preference event is broadcast. The preference event setup control module 243 displays the event information transferred from the head end 10 and executes the reservation when it is notified by the monitoring module 242 that the preference event is on the air.

The preference event reservation module 241 provides an interface that enables a viewer to search for the event information list transferred from the head end 10, select a desired preference event, and determine the reservation.

The monitoring module 242 provides a real-time check to evaluate whether there is any event information, e.g. event ID, that conforms to the event information on the preference event stored in the memory 250 and, if any, notifies it to the preference event setup control module 243.

The preference event setup control module 243 executes the preinstalled reservation.

The memory 250 stores and manages a programs for controlling the client terminal 20, the event information transferred from the head end 10, and the reservation.

Next, a preference event reservation system of a broadcasting program according to a second exemplary embodiment of the present invention will be described. A preference event reservation system of a second exemplary embodiment is the same as the preference event reservation system of the list exemplary embodiment, except that a controller 290 registers a preference channel or preference program, displays an event information list for the preference channel or preference program, mid makes a reservation for a preference event. Accordingly, the description of the same parts as the first exemplary embodiment will be omitted.

Figure 3:
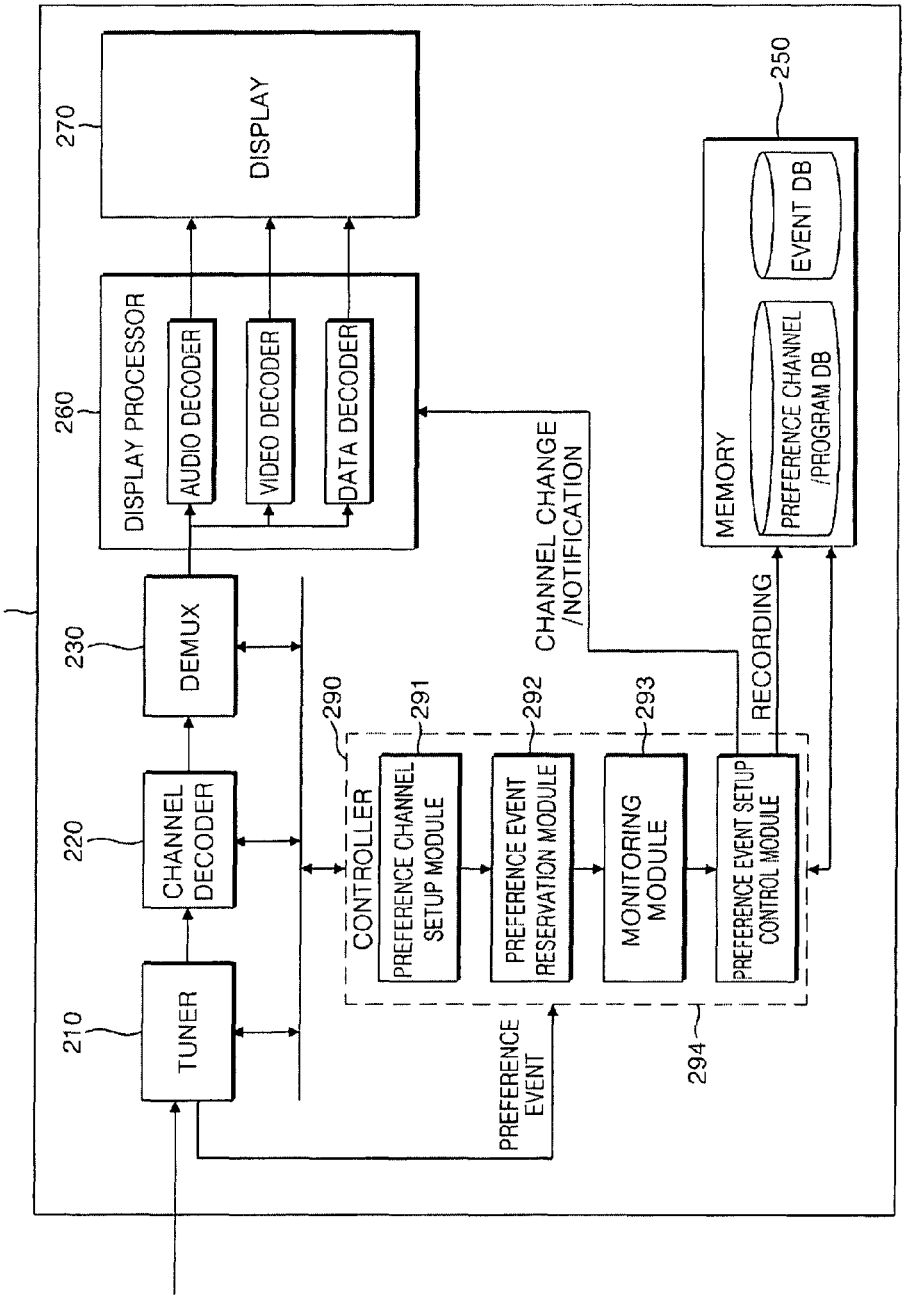
FIG. 3 is a block diagram of a controller in a client terminal according to a second exemplary embodiment of the present invention.

FIG. 3 is a block diagram of a controller in a client terminal according to a second exemplary embodiment of the present invention. Referring to FIG. 3, a controller 290 in a client terminal includes a preference channel setup module 291, a preference event reservation module 292, a monitoring module 293, and a preference event setup control module 294. The preference channel setup module 291 receives a key input from a viewer, sets up a viewer's preference channel or preference program, and stores it to a memory 250. The preference event reservation module 292 makes a reservation for a viewer's preference event out of an even information list for the preference channel or preference program and stores the reservation at the memory 250. The monitoring module 293 evaluates whether a broadcasting program that conforms to the preference channel or preference program and an event that corresponds to the preference event are transmitted. The preference event setup control module 294 displays the event information list transferred from the head end 10 and executes the reservation when it is notified by the monitoring module 293 that the preference channel or preference program is transferred.

The preference channel setup module 291 identifies the program information from EPG and stores at the memory 250 the preference channel or preference program selected by a viewer.

The preference channel setup module 291 stores channel information including a channel ID at the memory 250 when a preference channel is set up, and stores program information including a program ID at the memory 250 when a preference program is set up.

The monitoring module 293 determines whether there is the event information on the preference channel or preference program by evaluating whether there is any event information that conforms to the channel ID and program ID contained in the event information list.

When it is determined that there is an event information list for the preference channel or preference program, the preference event reservation module 292 displays the event information list, provides a viewer with an interface for allowing the viewer to make a reservation for the preference event and select the reservation, and stores the reserved preference event information and the reservation at the memory 250.

When the current channel is changed to other channel that broadcasts the preference event according to the reservation, the preference channel setup module 291 sets up the current channel as another preference channel.

Figure 4:
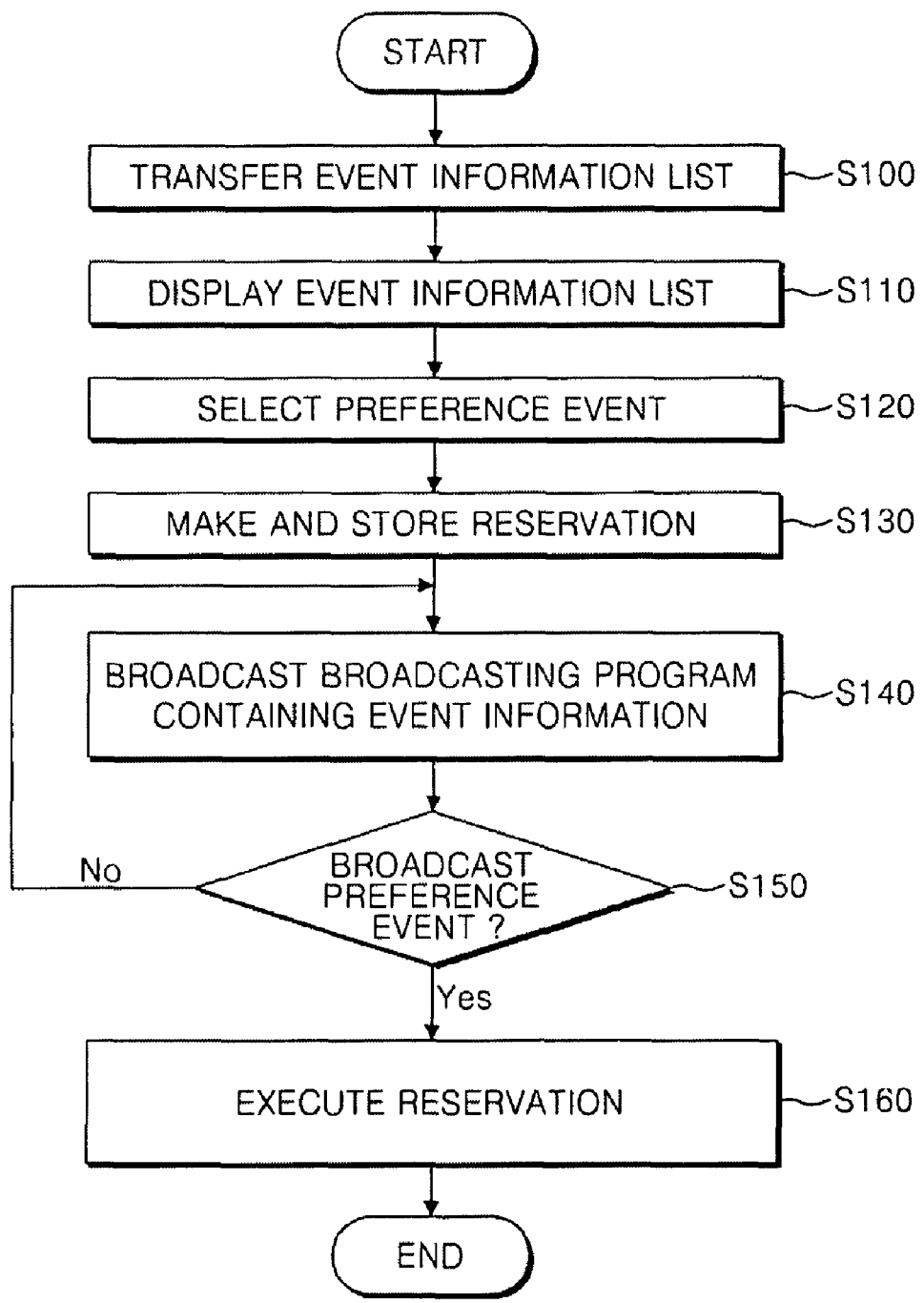
FIG. 4 is a flowchart schematically illustrating a method of reserving a preference event of a broadcasting program according to the first exemplary embodiment of the present invention.

FIG. 4 is a flowchart schematically illustrating a method of reserving a preference event of a broadcasting program according to the first exemplary embodiment of the present invention. Referring to FIG. 4, am event information list is transferred from the head end 10 to the client terminal 20 (Step 100). The event information list includes an event ID, a channel ID, a program ID, and the content of an event.

Next, the client terminal 20 allows a viewer to view the event information list (Step 110) to select a preference event (S120), make a reservation for the preference event, and stores the reservation (Step 130).

More specifically, the controller 240 displays the event information list, so that a desired preference event may be selected by searchingly for event information through a key input. When a preference event is selected, the preference event reservation module 241 provides an interface for making a reservation for the selected preference event. The selected preference event information and the reservation are stored at the memory 250. The reservation may be any one of preference event notification, a preference event recording, and an automatic channel change.

Next, the broadcasting program containing the event information is broadcast from the head end 10 to the client terminal 20 (Step 140). The event information is inserted by the event information input module 110, encoded by the encoding module 120, and transferred to the client terminal 20 over a broadcasting network. The event information includes an event ID, a start time of an event, an end time of in event, and a detail on an event.

More specifically, the preference event information stored at the memory 250 includes an event ID, a channel ID, a program ID, and the content of the event and the event information inserted into a program includes an event ID. Therefore the monitoring module 242 evaluates if the program that includes an event ID that conforms to the event ID of the preference event stored at the memory 250 is broadcast (Step 150).

Then, the preference event setup control module 243 executes the reservation when the preference event is broadcast (Step 160). More specifically, when the program containing the event ID that corresponds to the preference event is on the air, the start time of the event is extracted by the preference event setup control module 243. At this time, the preference event setup control module 243 creates a window that indicates the start of the preference event when the reservation is set up as preference event notification at the start time, records the preference event when the reservation is set up as a preference event recording, and automatically changes current event to the preference event when the reservation is set up as an automatic channel change. The preference event setup control module 243 extracts the start time of the event and creates a window that indicates the start time of the preference event before the preference event begins (e.g. 10 seconds before the start of the preference event) in order to allow a viewer to determine whether he/she will watch the preference event.

Figure 5:
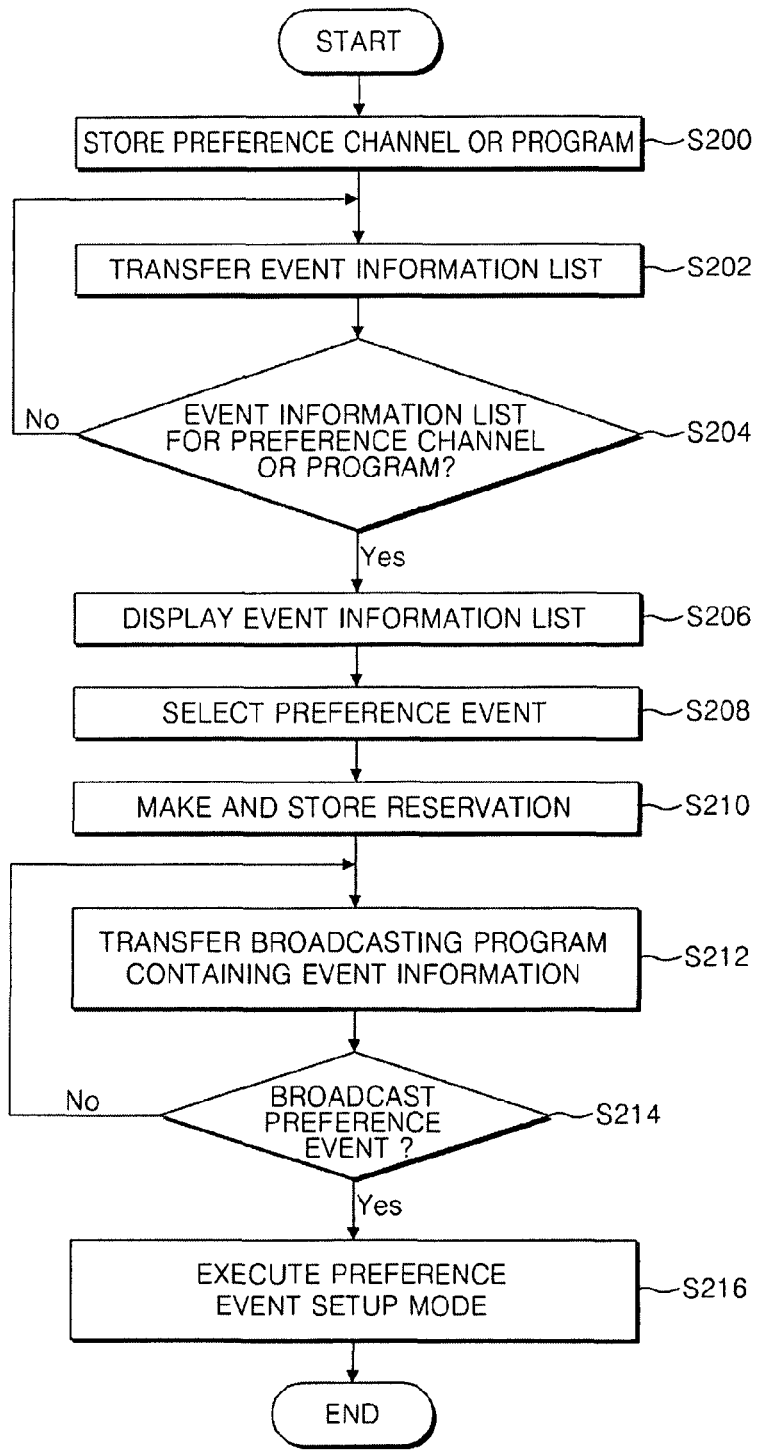
FIG. 5 is a flowchart schematically illustrating a method of reserving a preference event of a broadcasting program according to the second exemplary embodiment of the present invention.

FIG. 5 is a flowchart schematically illustrating a method of reserving a preference event of a broadcasting program according to the second exemplary embodiment of the present invention. The second exemplary embodiment of the present invention is the same as the first exemplary embodiment of the present invention, except that the preference event for the preference channel or preference program is only displayed to a viewer by setting up preference channel or preference program and an interface for making a reservation for the preference event reservation is provided.

Referring to FIG. 5, firstly, a preference channel or preference program is set up and stored at the memory 250 (Step 200). The information on the channel or program may be viewed by EPG to set up and store the preference channel or preference program. The preference channel or preference program is set up by the preference channel setup module 291 and the information on the preference channel or preference program is stored at the memory 250. The information on the preference program includes a program ID.

Next event information lists are transferred from the head end 10 to the client terminal 20 (Step 202).

Then, it is determined whether an event information list for the preference channel or preference program is transferred (Step 204) and when the event information list for the preference channel or preference program is transferred, the event information list is displayed (Step 206).

More specifically, the event information list includes an event ID, a channel ID, a program ID, and the content of an event, and the event monitoring module 293 analyzes the event information lists and determines whether there is any event information list that conforms to the program ID stored at the memory 250.

When it is determined that there is the event information list for the preference channel or preference program, the preference event reservation module 292 displays the event information list to a viewer.

Subsequently, the preference event is selected (Step 208), and then a reservation for the preference event is made and stored at the memory 250 (Step 210).

When the broadcasting program containing the event information is transferred from the head end 10 to the client terminal 20 (Step 212), it is determined whether the reserved preference event is broadcast (Step 214) and, when the reserved preference event is broadcast, the reservation is executed (Step 216).

As mentioned above, a preference event reservation system and a method of reserving a preference event according to exemplary embodiments of die present invention may check in real time the point of time when the preference event is on the air by receiving the information on the specific preference event.

Although the exemplary embodiments of the present invention have been described herein with reference with the accompanying drawings, it is understood that the present invention is not be limited to these exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A preference event reservation system of a broadcasting program comprising:
a head end which inserts event information into a broadcasting program and transferring the broadcasting program containing the event information and an event information list; and
a client terminal, the client terminal comprising:
a controller which displays the event information list transferred from the head end, controls a reservation for a preference event out of the event information list, and controls execution of the reservation when event information which corresponds to the preference event is transferred from the head end,
wherein the reservation includes a preference event broadcasting notification, an automatic preference channel change, and a preference event recording; and
a memory which stores the reservation for the preference event,
wherein the event information is information of a preference event included in a preference program, and specifies details of the preference event included in the preference program,
wherein executing the reservation comprises creating a window that notifies a current program of a start of the preference event when the reservation is set up as a preference event notification, recording and storing the preference event at a memory when the reservation is set up as a preference event recording, and changing a current program to the preference program including the preference event when the reservation is set up as an automatic preference channel change,
wherein the controller comprises:
a preference channel setup module which receives a key input from a viewer, sets up the preference channel or the preference program, and stores the preference channel or the preference program at the memory;
a preference event reservation module which receives a key input from the viewer, makes the reservation for the preference event, and stores the reservation at the memory;
a monitoring module which evaluates whether the preference channel or the preference program is broadcast and the preference event is broadcast; and
a preference event setup control module which displays the event information list when the preference event set up control module is notified through the monitoring module which the preference channel or the preference program is broadcast, and executes the reservation when the preference event set up control module is notified through the monitoring module that the preference event is broadcast,
wherein broadcasting the broadcasting program comprises:
inserting the event information which includes an identifier of an event, a start time of the event, an end time of the event, and a content of the event into the broadcasting program; and
encoding the broadcasting program containing the event information and transferring the encoded broadcasting program to the client terminal over a broadcasting network.

2. The preference event reservation system of claim 1, wherein the head end comprises, an event input module which inserts the event information into the broadcasting program; and an event encoding module which encodes and broadcasts the broadcasting program which contains the event information.

3. A preference event reservation system of a broadcasting program comprising:
a head end which inserts event information into a broadcasting program and broadcasts the broadcasting program which contains the event information and an event information list; and
a client terminal, the client terminal comprising:
a controller which controls setup of a preference channel or a preference program, monitors the broadcasting program, displays the event information list for the preference program when the preference program is broadcast, controls a reservation of a preference event out of the event information list, and controls execution of the reservation when event information which corresponds to the preference event is transferred from the head end; and
a memory which stores the reservation for the preference event,
wherein the event information is information of a preference event included in the preference program, and specifies details of the preference event included in the preference program, and
wherein the reservation includes a preference event broadcasting notification, an automatic preference channel change, and preference event recording,
wherein executing the reservation comprises creating a window that notifies a current program of a start of the preference event when the reservation is set up as a preference event notification, recording and storing the preference event at a memory when the reservation is set up as a preference event recording, and changing a current program to the preference program including the preference event when the reservation is set up as an automatic preference channel change,
wherein the controller comprises:
a preference channel setup module which receives a key input from a viewer, sets up the preference channel or the preference program, and stores the preference channel or the preference program at the memory;
a preference event reservation module which receives a key input from the viewer, makes the reservation for the preference event, and stores the reservation at the memory;
a monitoring module which evaluates whether the preference channel or the preference program is broadcast and the preference event is broadcast; and
a preference event setup control module which displays the event information list when the preference event set up control module is notified through the monitoring module which the preference channel or the preference program is broadcast, and executes the reservation when the preference event set up control module is notified through the monitoring module that the preference event is broadcast,
wherein broadcasting the broadcasting program comprises:

inserting the event information which includes an identifier of an event, a start time of the event, an end time of the event, and a content of the event into the broadcasting program; and encoding the broadcasting program containing the event information and transferring the encoded broadcasting program to the client terminal over a broadcasting network.

4. The preference event reservation system of claim 3, wherein the head end comprises, an event input module which inserts the event information into the broadcasting program; and an event encoding module which encodes and broadcasts the broadcasting program containing the event information.

5. The preference event reservation system of claim 3, wherein when the preference event of the preference program is broadcast, the preference channel setup module automatically sets up a current channel or a current program as another preference channel or another preference program.

6. The preference event reservation system of claim 3, wherein the preference event setup control module displays an event list for each channel or program without respect to a current program or an event list for the current program.

7. The preference event reservation system of claim 3, wherein the preference event setup control module notifies the current program of the broadcast of the preference event before the event is broadcast.

8. A method of reserving a preference event of a broadcasting program comprising:
   transferring an event information list from a head end to a client terminal;
   displaying the event information list to make a reservation for a preference event out of the event information list;
   broadcasting a broadcasting program containing event information from the head end to the client terminal; and
   executing the reservation when event information which corresponds to the preference event is transferred,
   wherein the reservation includes a preference event broadcasting notification, an automatic preference channel change, and a preference event recording;
   wherein the event information is information of a preference event included in a preference program, and specifies details of the preference event included in the preference program;
   wherein executing the reservation comprises creating a window that notifies a current program of a start of the preference event when the reservation is set up as a preference event notification, recording and storing the preference event at a memory when the reservation is set up as a preference event recording, and changing a current program to the preference program including the preference event when the reservation is set up as an automatic preference channel change,
   wherein the controller comprises:
   a preference channel setup module which receives a key input from a viewer, sets up the preference channel or the preference program, and stores the preference channel or the preference program at the memory;
   a preference event reservation module which receives a key input from the viewer, makes the reservation for the preference event, and stores the reservation at the memory;
   a monitoring module which evaluates whether the preference channel or the preference program is broadcast and the preference event is broadcast; and
   a preference event setup control module which displays the event information list when the preference event set up control module is notified through the monitoring module which the preference channel or the preference program is broadcast, and executes the reservation when the preference event set up control module is notified through the monitoring module that the preference event is broadcast,
   wherein broadcasting the broadcasting program comprises:
   inserting the event information which includes an identifier of an event, a start time of the event, an end time of the event, and a content of the event into the broadcasting program; and
   encoding the broadcasting program containing the event information and transferring the encoded broadcasting program to the client terminal over a broadcasting network.

9. A method of reserving a preference event of a broadcasting program comprising:
   setting up a preference channel or a preference program and storing the preference channel or the preference program at a memory;
   transferring an event information list from a head end to a client terminal;
   displaying the event information list transferred from the head end for the channel or the preference program to make a reservation for a preference event out of the event information list when the event information list for the preference channel or the preference program is transferred;
   broadcasting a broadcasting program containing event information from the head end to the client terminal; and
   executing the reservation when event information which corresponds to the preference event is transferred,
   wherein the event information is information of a preference event included in the preference program, and specifies details of the preference event included in the preference program, and
   wherein the reservation includes a preference event broadcasting notification, an automatic preference channel change, and a preference event recording,
   wherein executing the reservation comprises creating a window that notifies a current program of a start of the preference event when the reservation is set up as a preference event notification, recording and storing the preference event at a memory when the reservation is set up as a preference event recording, and changing a current program to the preference program including the preference event when the reservation is set up as an automatic preference channel change,
   wherein the controller comprises:
   a preference channel setup module which receives a key input from a viewer, sets up the preference channel or the preference program, and stores the preference channel or the preference program at the memory;
   a preference event reservation module which receives a key input from the viewer, makes the reservation for the preference event, and stores the reservation at the memory;
   a monitoring module which evaluates whether the preference channel or the preference program is broadcast and the preference event is broadcast; and
   a preference event setup control module which displays the event information list when the preference event set up control module is notified through the monitoring module which the preference channel or the preference program is broadcast, and executes the reservation when the preference event set up control module is notified through the monitoring module that the preference event is broadcast, wherein broadcasting the broadcasting program comprises:

inserting the event information which includes an identifier of an event, a start time of the event, an end time of the event, and a content of the event into the broadcasting program; and encoding the broadcasting program containing the event information and transferring the encoded broadcasting program to the client terminal over a broadcasting network.

10. The method of claim 9, wherein displaying the event information list comprises, monitoring the broadcasting program transferred to the client terminal and evaluating whether the broadcasting program conforms to the preference program.

11. The method of claim 9, further comprising:

notifying the current program of the broadcast of the preference event before the preference event is broadcast to select whether the preference event will be broadcast when the preference event setup mode is set up as the preference event notification or the automatic preference channel change.

* * * * *